United States Patent [19]

Khudenko et al.

[11] Patent Number: 4,713,102

[45] Date of Patent: Dec. 15, 1987

[54] METHOD OF CONCENTRATING MULTICOMPONENT LIQUID PRODUCTS

[75] Inventors: Boris M. Khudenko; Jack Zbar, both of Atlanta, Ga.

[73] Assignee: Insta, Inc., Atlanta, Ga.

[21] Appl. No.: 897,326

[22] Filed: Aug. 18, 1986

Related U.S. Application Data

[63] Continuation-in-part of Ser. No. 657,580, Oct. 4, 1984, abandoned.

[51] Int. Cl.[4] .......................... B01D 9/04; C02F 1/22
[52] U.S. Cl. ........................................ 62/535; 62/123; 62/544
[58] Field of Search ................. 62/123, 533, 534, 535, 62/544

[56] References Cited

U.S. PATENT DOCUMENTS

| | | | |
|---|---|---|---|
| 3,218,817 | 11/1965 | Tooke | 62/534 |
| 3,442,801 | 5/1969 | Anderson | 62/533 |
| 3,474,635 | 10/1969 | Rowe, Jr. | 62/534 |
| 3,675,436 | 7/1972 | Ganiaris | 62/535 |
| 3,803,860 | 4/1974 | Nagashima et al. | 62/534 |

Primary Examiner—Ronald C. Capossela
Attorney, Agent, or Firm—Needle & Rosenberg

[57] ABSTRACT

A method and apparatus for concentrating multicomponent liquid product containing volatile and nonvolatile constituents are provided, comprising mixing liquid product with liquid refrigerant gas in a freezing chamber, removing ice crystals containing entrained multicomponent liquid product from the chamber, removing the volatile constituents of the liquid product and vaporized liquid refrigerant gas from the chamber, separating the volatile constituents and vaporized refrigerant gas, recirculating the volatile constituents into the freezing chamber so as to mix with the remaining liquid product in the chamber, and removing concentrate of the liquid product from the chamber.

17 Claims, 3 Drawing Figures

METHOD OF CONCENTRATING MULTICOMPONENT LIQUID PRODUCTS

This application is a continuation-in-part of prior application Ser. No. 657,580, filed Oct. 4, 1984 now abandoned.

BACKGROUND

The present invention relates to a more efficient method of concentrating multicomponent liquid products, and more particularly, involves the retention of volatile constituents in the concentrated product through means of a closed system and the presence of secondary freezing agents.

Separation of individual components from multicomponent liquids by crystalization of one component and removal of the ice crystals is routinely used in analytical chemistry. For example, to separate water from a brine solution, small amounts of solution may be frozen and the ice crystals removed, leaving behind the concentrate. Crystalization is usually obtained by contacting the multicomponent liquid product and a nontoxic, nonpolar, low water soluble gas with low boiling point. Such liquid refrigerant gases include isobutane, freon, carbon dioxide, ethane and propane. Ice crystals are formed in the course of vaporization of the liquified refrigerant gas. A hydrate may also be formed between the water and the liquid refrigerant gas.

It is well known that a layer of the liquid to be treated adheres to the ice, and that the problem of its removal exists. One method for removal of this layer (see U.S. Pat. No. 3,525,230 to Smith) is washing with fresh water. However, if the wash water is returned in the solution being concentrated, the solution is diluted and additional concentration of solution is required. If wash water is not returned, there is a great loss of product, as well as volatile and nonvolatile constituents.

It is also well known that substantial entrainment of constituents from the liquid to be treated in ice crystals results due to fast freezing by direct contact between the liquid refrigerant gas and the liquid. Water crystal growth is faster than the diffusion of the molecules of admixtures from the ice crystals, and, therefore, these molecules become entrained in the crystal structure.

Another problem found in the traditional concentrating methods using liquid refrigerant gas is the loss of volatile constituents. These constituents, which in cases involving food products often comprise most of the flavor and scent, are trapped in the refrigerant gas and are lost when the gas is expelled. In addition, the presence of the volatile constituents in the liquid refrigeration gas can interfere with the operation of compressors, valves and other elements of the system.

Another method of concentrating multicomponent liquids involves vacuum vaporization and formation of ice due to temperature reduction in the course of such vaporization. The ice is collected and melted. The disadvantage of this process modification is that almost all volatile constituents will be lost if present in the treated liquid.

It is an object of the present invention to provide a more efficient method for concentrating multicomponent liquids while retaining volatile and nonvolatile constituents in the concentrate.

SUMMARY OF THE INVENTION

According to the present invention, there is provided an improved method of concentrating multicomponent liquids containing volatile and nonvolatile constituents. Ice crystals are formed from the water fraction of the liquid by the use of the heat of vaporization of a liquified refrigerant gas and are separated from the liquid concentrate. Recirculating and treating the refrigerant gas and recapturing constituents also minimizes loss of volatile and nonvolatile constituents.

Secondary freezing agents may be used so as to reduce desorption of the volatile constituents in the refrigerant gas. Ice is formed around the particles of the secondary freezing agent. Because the first thin layer of ice formed around the particles serve as an insulator and slows growth, ice with lower constituent content is formed. In addition, the particles serve as seeds to improve ice crystallization. Therefore, the advantage of using secondary freezing agents is the formation of larger, more easily dewatered ice crystals without entrainment of valuable constituents. Also, there is no contact between the gas phase formed by vaporizing incoming fresh refrigerant gas and the concentrate. Therefore, there is no loss of volatile constituents from the concentrate into the gas phase.

By passing the materials through numerous freezing chambers, the present invention maximizes the yield of concentrate from the unit quantity of raw material, and permits the maximum reconstitution of the original flavor upon dilution of the concentrate with water. These and further objects and advantages will appear from the following description with reference to the drawings.

DESCRIPTION OF THE PREFERRED EMBODIMENTS

Figure 1:
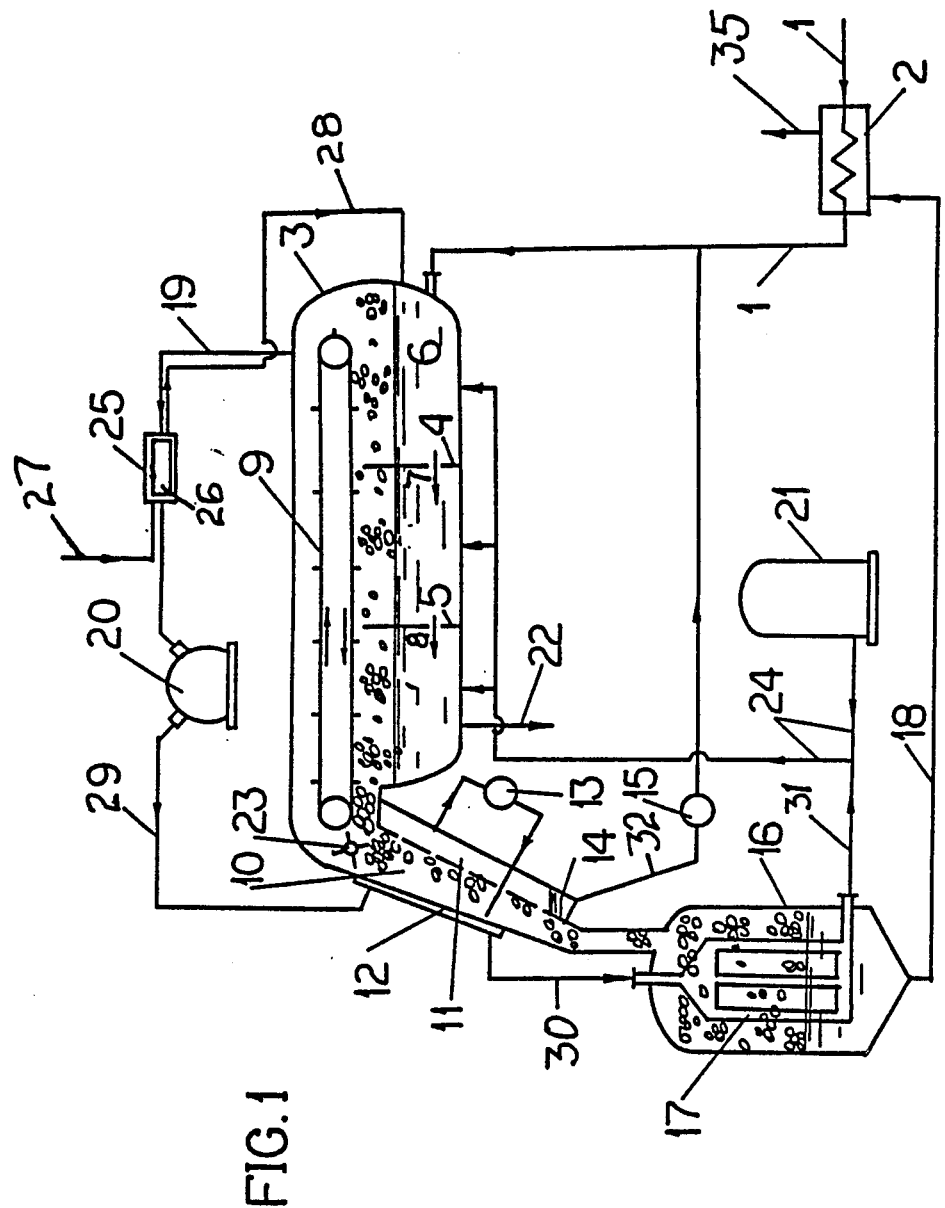
FIG. 1 is a schematic drawing of the present invention.

Referring now to FIG. 1, multicomponent liquid product is supplied through a pipe 1 to a heat exchanger 2 and passes thence by pipe 1 to a freezing chamber 3. Fresh refrigerant gas is introduced from a storage of fresh refrigerant gas 21 to the freezing chamber 3 by means of pipe 24. The freezing chamber 3 is divided by baffles 4 and 5 with openings 7 and 8 within each baffle respectively, so that the multicomponent liquid product may flow throughout the chamber 3. Ice is formed in freezing chamber 3 through the use of heat of vaporization of a liquified refrigerant gas such as isobutane, freon, ethane, propane or other nonpolar, low water soluble gas with low boiling points. Concentrated product forms at the bottom of the freezing chamber 3 and is removed through pipe 22. Vaporized refrigerant gas and volatile constituents are withdrawn through a pipe 19. A means for removing volatile constituents 25 from the vaporized refrigerant gas may be present on pipe 19 before a compressor 20.

This means for removing volatile constituents 25 contains a filter 26, preferably a carbon-absorbate type, and is connected to a steam pipe 27 at one side. Incoming steam is used to flush the volatiles caught in the filter 26 from the means for removing volatiles 25 back through pipe 28 to the freezing chamber 3.

The refrigerant gas passes through the means for removing volatiles 25 to the compressor 20 and leaves compressed, and then is heated through a pipe 29 which runs adjacent to a heat exchange device 12 connected to a thawing chamber 10, thereby contributing to the partial thawing in the thawing chamber 10 of ice transported from the freezing chamber 3. The refrigerant gas is thence transported by pipe 30 through a gas liquification apparatus 16, which contains a heat exchange element 17 cooled by ice transported to heat exchange element 17 from thawing chamber 10. The liquid refrigerant gas then passes through a pipe 31, where it is mixed with fresh refrigerant gas passing through a pipe 24 from a storage of fresh liquified refrigerant gas 21, to the freezing chamber 3 where it is reused. Any volatile constituents not captured by the means for removing volatile constituents 25 are thereby placed back into the freezing chamber 3.

The ice formed in the freezing chamber 3 has entrained in and on it constituents from the liquid to be treated. This ice with entrained constituents is forced from the freezing chamber 3 to the thawing chamber 10. This may be accomplished by a scraping device 9 lightly contacting the level of floating ice so that ice is pushed into the thawing chamber 10. A means for crushing ice 23 is located at the entrance of the thawing chamber 10, the ice crusher 23 aiding in the release of constituents entrained in the ice as the ice passes from the freezing chamber 3 to the thawing chamber 10. The ice in the thawing chamber 10 is partially melted due to heat radiation from the heat exchange device 12 attached to the thawing chamber 10. A screen 11 is present in the thawing chamber 10, separating the ice from a liquid collection chamber 14. As the ice in the thawing chamber 10 melts, the entrained constituents, including those which were adhering to the ice by surface tension, pass through the screen 11 and are collected in the liquid collection chamber 14. A gas circulation blower 13 produces lower pressure in the liquid collection chamber 14 and elevated pressure in the thawing chamber 10, thus affecting water melt removal across the screen 11.

The liquid collected in the liquid collection chamber 14 is transported through a pipe 32, preferably aided by pump 15, to line 1, where it is mixed with the incoming multicomponent liquid product.

The ice remaining in the thawing chamber 10 is now in pure form. The ice in pure form flows into the gas liquification apparatus 16, where it is used to cool the refrigerant gas passing through pipe 30. The ice in pure form melts in the gas liquification apparatus 16, and the remaining pure water is carried by a pipe 18 to the heat exchanger 2 as coolant, and is then removed through a pipe 35.

Figure 2:
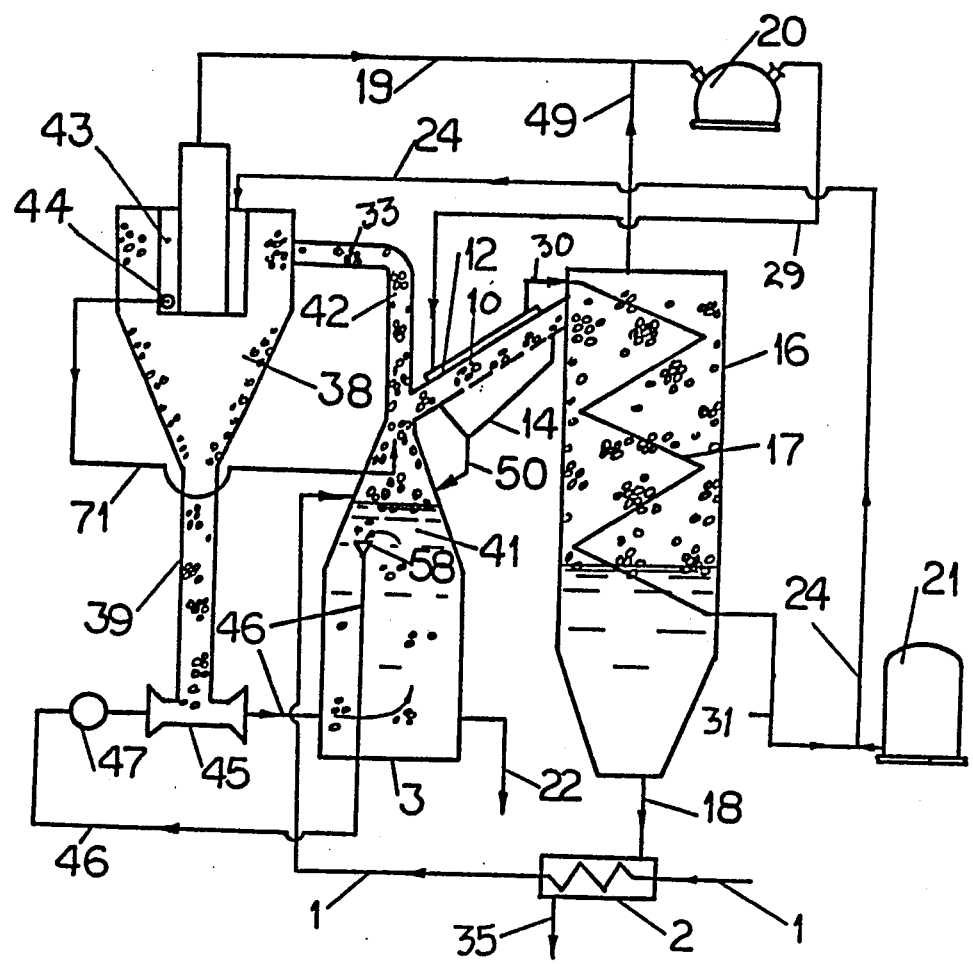
FIG. 2 is a schematic drawing of a second embodiment of the present invention.

FIG. 2 is an alternate preferred embodiment of the invention described in FIG. 1, and contains the following additional elements. The freezing chamber 3 is attached to a cooling chamber 38 by way of a stand pipe 42, which provides for fluidized bed transport of small particles of ice from freezing chamber 3 to the cooling chamber 38. Larger sized ice particles flow directly into a thawing chamber 10 as described in FIG. 1. The size classification of particles will occur in pipe 42 because smaller particles will be transported in this pipe 42 faster and larger particles will accumulate at the bottom of this pipe. Also present within the freezing chamber 3, cooling chamber 38 and the gas liquification apparatus 16 are secondary freezing agents 33. These may be, for example, aluminum beads, sand, or other material with density greater than the densities of the water, the raw liquid, and the liquified gas. The secondary freezing agents 33 serve as seeds and result in improved ice crystallization.

The cooling chamber 38 is equipped with a vaporization chamber 43 for partial vaporization of liquified refrigerant gas transported from the freezing chamber 3. Additional liquified refrigerant gas is supplied to the vaporization chamber 43 through a pipe 24 from a storage of fresh liquified refrigerant gas 21. Remaining liquified gas and vaporized gas is discharged through an opening 44 and carried by a pipe 71 to the upper region 41 of the freezing chamber 3. The secondary freezing agents flow from the cooling chamber 38 through a pipe 39 to an ejector 45 and are then forced by means of a pump 47 into the lower region of the freezing chamber 3 through a pipe 46.

A pipe 19 carries vaporized refrigerant gas from the cooling chamber 38 to the compressor 20. A pipe 49 carries vaporized refrigerant gas from the gas separation apparatus 16 to the compressor 20. Liquified refrigerant gas is then carried from the compressor 20 by a pipe 29 to the heat exchange device 12 and through the heat exchange element 17 of the gas liquification apparatus 16 by way of pipe 30. The liquid refrigerant gas then passes through a pipe 19C, where it is mixed with fresh refrigerant gas, and carried by a pipe 24 to the vaporization chamber 43.

Figure 3:
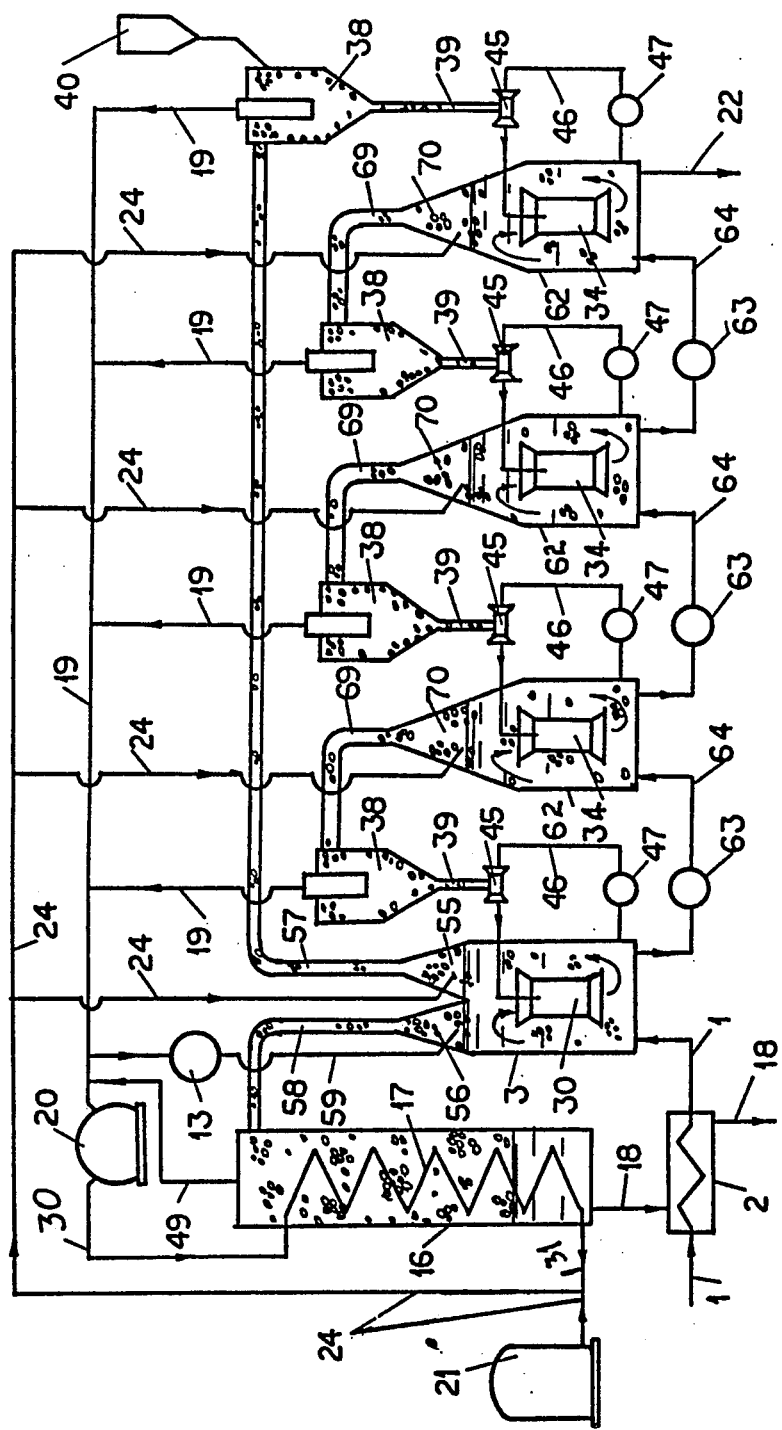
FIG. 3 is a schematic drawing of a third embodiment of the present invention.

FIG. 3 is a third alternate preferred embodiment of the invention described in FIGS. 1 and 2, and contains the following additional elements.

The top portion of the first freezing chamber 3 is divided into two conical sections, 55 and 56 respectively. Conical section 56 is attached by a stand pipe 58 to the gas liquification apparatus 16. Liquified refrigerant gas is fed from a storage of fresh liquid refrigerant gas through a line 24 to the bottom of conical section 55 and is vaporized, thereby cooling the secondary freezing agents 33. Secondary freezing agents 33, which may be ice crystals, and refrigerant gas are transported through pipe 57 to an initial cooling chamber 38 for separation of the secondary freezing agents 33 from the vaporized gas.

The separated gas from the initial cooling chamber 38 is transported by pipe 19 to the compressor 20 and then by line 51 through the heat exchange element 17 of the gas liquification apparatus 16.

The cooled secondary freezing agents 33 are transported through a pipe 39 located at the bottom of the initial cooling chamber 38 to an ejector 45 and are forced from the initial cooling chamber 38 into the last of multiple intermediary freezing chambers 62. In the intermediary freezing chambers 62, mixing is provided by a circulation loop comprised of mixing chambers 34, a circulating pipe 46, a pump 47 and the ejector 45. Vaporized gas and secondary freezing agents are then transported through a pipe 69 to an intermediary cooling chamber 38. The separated gas from the intermediary cooling chamber 38 is transported by pipe 19 to the compressor 20. These steps are repeated numerous times through each of a numbered preceding intermediary cooling chambers 38 until the secondary freezing agents 3 are returned to the first freezing chamber 3 in pure form.

The partially concentrated multicomponent liquid product in the lower portion of the first freezing chamber 3 is transported by pipe 64 with the aid of a pump 63 to the lower portion of the next following intermediary freezing chamber 62. This process is repeated from each successive intermediary freezing chamber 62 to the next, during which the liquid becomes increasingly concentrated as any remaining water forms ice and is transported through pipe 69 into the next preceding intermediary cooling chamber 62. The ice then is moving stepwise in counterflow of the liquid. This results in liquid of greater concentration coming into contact with less pure ice, which in turn results in the concentrated liquid losing less material to the ice during the counterflow. The final concentrated product is removed from the last successive intermediary freezing chamber 62 through a pipe 22. While the invention has been described in detail with particular reference to the preferred embodiment thereof, it will be understood that variations and modifications can be effected within the spirit and scope of the invention as previously described and as defined by the claims.

What is claimed is:

1. A method of concentrating multicomponent liquid product containing volatile and nonvolatile constituents comprising the steps of:
   mixing said multicomponent liquid product and a liquid refrigerant gas in at least one freezing chamber;
   forming crystals of ice containing entrained multicomponent liquid product by means of vaporization of said refrigerant gas;
   applying heat to said crystals of ice containing entrained multicomponent liquid product so that said entrained multicomponent liquid product is separated from said crystals of ice;
   collecting said separated entrained multicomponent liquid product;
   recirculating said separated entrained multicomponent liquid product to said at least one freezing chamber;
   removing volatilized constituents of said multicomponent liquid product and said vaporized liquid refrigerant gas to said freezing chamber, recirculating said volatilized constituents of said multicomponent liquid product and said vaporized liquid refrigerant gas to said freezing chamber so that said volatilized constituents and said vaporized liquid refrigerant gas is mixed with said multicomponent liquid product; and
   removing said multicomponent liquid product from said freezing chamber.

2. The method as described in claim 1, which further comprises:
   separating said volatilized constituents of said multicomponent liquid product and said vaporized liquid refrigerant gas after removal from said freezing chamber;
   recirculating said separated volatilized constituents of said multicomponent liquid product to said freezing chamber such that said volatilized constituents mix with said multicomponent liquid product;
   compressing said vaporized liquid refrigerant gas into a liquid;
   utilizing said liquid refrigerant gas in a heat exchange means to melt said crystals of ice containing entrained multicomponent liquid product.

3. The method as described in claim 2, which further comprises liquifying said liquid refrigerant gas after it leaves said heat exchange means by cooling said liquid refrigerant gas by means of said crystals of ice in a gas liquification means.

4. The method as described in claim 3, which further comprises cooling said multicomponent liquid prior to initial introduction to said at least one freezing chamber product by means of an initial heat exchanger.

5. The method as described in claim 4, which further comprises utilizing melt of said crystals of ice to cool said incoming multicomponent liquid product in said initial heat exchanger.

6. The method as described in claim 5, and further comprising passing said secondary freezing agents and liquid refrigerant gas from said freezing chamber to a cooling chamber;
   vaporizing and removing said liquid refrigerant gas; and
   recirculating said secondary freezing agents from said cooling chamber to said freezing chamber.

7. The method as described in claim 6, wherein said removed vaporized liquid refrigerant gas is compressed and used as a coolant in said heat exchange means.

8. The method as described in claim 7, wherein said secondary freezing agents are passed from an initial freezing chamber through a plurality of successive freezing chambers and cooling chambers before reentering the first such freezing chamber.

9. The method as described in claim 8, wherein said multicomponent liquid product is passed from an initial freezing chamber to a plurality of successive freezing chambers and removed from the final such freezing chamber.

10. The method as described in claim 9, and further comprising moving said secondary freezing agents in counterflow to said multi-component liquid product to said secondary freezing agents.

11. Apparatus for concentrating multicomponent liquid products which comprises:
    at least one freezing chamber in which said multicomponent liquid product is mixed with liquid refrigerant gas;
    means for removing crystals of ice containing entrained multicomponent liquid product from said freezing chamber;
    means for removing volatile constituents of said multicomponent liquid product and vaporized liquid refrigerant gas from said freezing chamber;
    means for separating said volatile constituents and said vaporized refrigerant gas;
    means for recirculating said volatile constituents into said freezing chamber so that said volatile constituents are mixed with said multicomponent liquid product in said freezing chamber; and
    a means for removing concentrate of said multicomponent liquid product.

12. An apparatus for concentrating multicomponent liquid product as described in claim 11, which further comprises:
    thawing chamber in which said crystals of ice containing entrained multicomponent liquid product is partially melted;
    means for moving crystals of ice containing entrained multicomponent liquid product from said freezing chamber to said thawing chamber;
    means for collecting multicomponent liquid product removed from said crystals of ice; and means for recirculating said multicomponent liquid product removed form said crystals of ice to said freezing chamber.

13. An apparatus for concentrating multicomponent liquid product as described in claim 12, which further comprises:
    means for separating said volatilized constituents of said multicomponent liquid product from said vaporized liquid refrigerant gas;
    means for recirculating said separated volatilized constituents of said multicomponent liquid product into said freezing chamber so that said volatilized constituents are mixed with said multicomponent liquid product;
    means for compressing said separated liquid refrigerant gas into a liquid; and
    means for heat exchange adjacent to said thawing chamber, said liquified refrigerant gas passing through said means for heat exchange so as to separate said crystals of ice and said entrained multicomponent liquid product.

14. The apparatus for concentrating multicomponent liquid product as described in claim 13, which further comprises:
    means for cooling said liquid refrigerant gas after it passes said means for heat exchange;
    an initial heat exchanger connected to a pipe carrying incoming multicomponent liquid product to said freezing chamber;
    a pipe for carrying said cooled liquid refrigerant from said means for cooling said liquid refrigerants to said initial heat exchanger.

15. The apparatus for concentrating multicomponent liquid product as described in claim 14, which further comprises a means for delivering fresh liquid refrigerant gas into said freezing chamber.

16. The apparatus for concentrating multicomponent liquid product as described in claim 15, which further comprises:
    at least one cooling chamber connected by a pipe to said freezing chamber of sufficient size to allow passage of secondary freezing agents between said freezing chamber and said cooling chamber;
    a pipe connecting the bottom portion of said cooling chamber and a next preceding chamber; and
    a pump capable of forcing said secondary freezing agents from said cooling chamber to said next preceding freezing chamber through said connecting pipe.

17. The apparatus for concentrating multicomponent liquid product as described in claim 16, which further comprises a plurality of intermediary freezing chambers each capable of receiving secondary freezing agents from succeeding cooling chamber, and capable of receiving liquid product from a succeeding freezing chamber.

* * * * *